Aug. 20, 1940.   H. NEUWIRTH   2,211,833
PHOTOGRAPHIC PRINTING FRAME
Filed Nov. 22, 1939
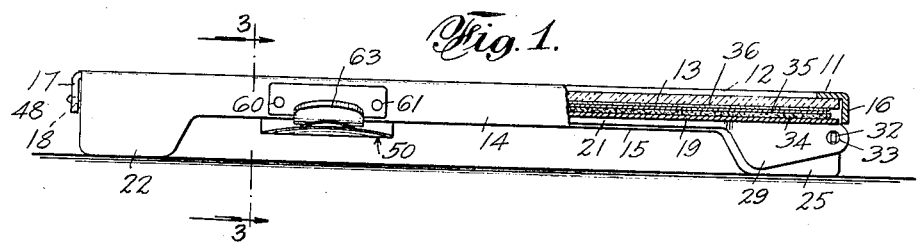
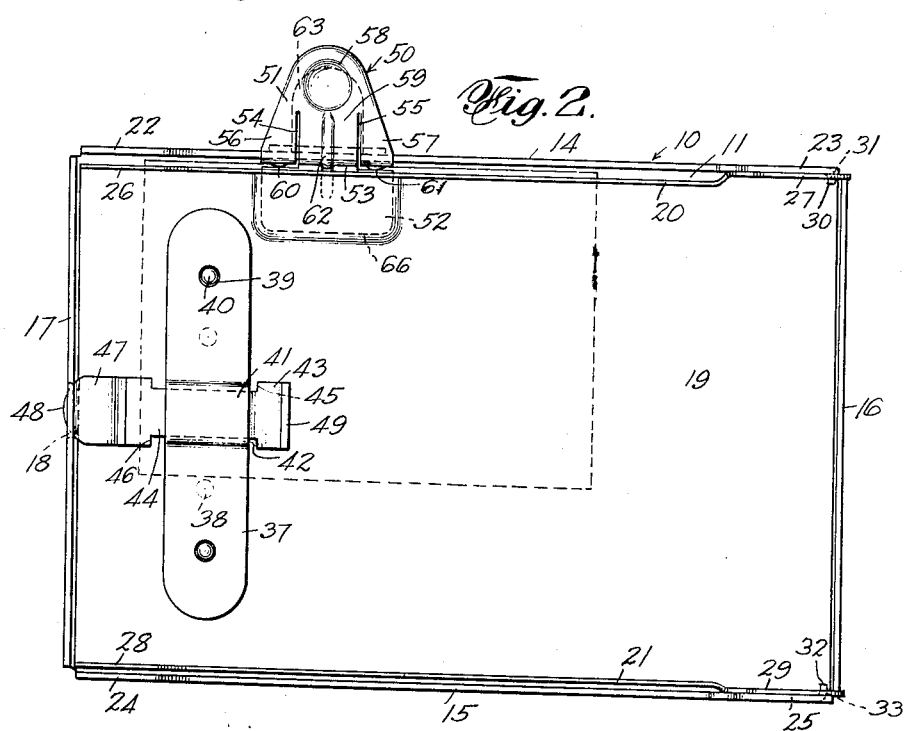
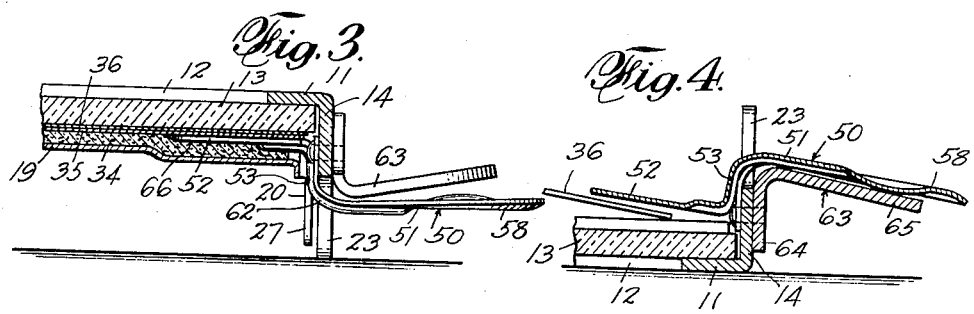
INVENTOR
*Herman Neuwirth*
BY
ATTORNEY Patented Aug. 20, 1940

2,211,833

UNITED STATES PATENT OFFICE 2,211,833

PHOTOGRAPHIC PRINTING FRAME

Herman Neuwirth, Brooklyn, N. Y.

Application November 22, 1939, Serial No. 305,593

10 Claims. (Cl. 95—77)

This invention relates to photographic printing frames and particularly to the means for releasably holding in place the various movable frame parts including the negative and the paper used with the printing frame.

My invention contemplates the provision of simple, easily operated and inexpensive auxiliary means cooperating with the frame-back for holding the negative and the sensitized sheet in place in the frame during the printing operation, and also operable when the frame-back is released to permit inspection of the sensitized sheet without danger of the displacement of the sheet relatively to the negative.

My invention further contemplates the provision of a frame-back designed not only to co-operate with the auxiliary holding means for adequately holding the negative and sensitized sheet in place in the frame, but also provided with simple, inexpensive and efficient means for removably locking it in place under the required pressure.

My invention further contemplates the provision of simple and inexpensive one-piece holding members movable to a predetermined limited extent into releasing positions and cooperating with the frame for holding the negative and sheet and also for holding the frame-back.

The various objects of the invention will be clear from the description which follows and from the drawing, in which, Fig. 1 is a side elevation partly in section of my improved frame, as it appears supported by its legs on a supporting surface during the printing operation.

Fig. 2 is a bottom plan view of the printing frame.

Fig. 3 is a fragmentary vertical section taken on the line 3—3 of Fig. 1.

Fig. 4 is a similar view of the same in its reversed position and showing the auxiliary holding means in its released position.

In the practical embodiment of the invention which I have shown by way of example, the main holding frame 10 is preferably made of a single piece of sheet metal, being provided with a flat top 11 having an opening 12 therein through which the glass plate 13 is visible. The flange 14 depends from the top 11 at one side edge thereof and a similar side flange 15 depends from the other side edge thereof, said flanges being bent integrally in one piece with the top. Similarly, at one end edge is the end flange 16 and at the other end edge is the longer end flange 17 provided with the horizontally elongated slot 18 for the purpose later to be described.

The frame-back 19 also of a single piece of sheet metal, is provided with the side flange 20 closely adjacent the side flange 14 when the parts are in their operative positions and with the opposed side flange 21 closely adjacent the flange 15 of the frame part 10. It will be understood that the spacing shown in the drawing between the flanges 14 and 20 and between the flanges 15 and 21 has been exaggerated for the purposes of clarity. Each of the side flanges of the frame 10 and of the back 19 is provided at its end parts with a coplanar extension. For example, the flange 14 has the extensions 22 and 23 at the respective ends thereof. The flange 15 is provided with similar extensions 24 and 25 while the flange 20 carries the extensions 26 and 27 and the flange 21 has the extensions 28 and 29 thereon. The extensions of the frame 10 serve as legs to support the printing frame, while the extensions of the back serve to stiffen the back against distortion and to provide hinging members therefor.

The back is of such size as to fit easily within the flanges of the frame 10 and is pivoted thereto to swing out of the way when it is desired to insert a negative and a sheet of sensitized paper against the glass plate 13. For this purpose, part of the material of the flange 23 is cut from said flange and bent inwardly to provide the pivot 30 passing through the perforation 31 of the flange 27. Similarly, the pivot 32 struck from the flange 25 passes through the perforation 33 in the flange 29 whereby the right end of the back, as viewed in Figs. 1 and 2, is pivotally secured to the frame 10 and the left end thereof may be raised and lowered as desired. Preferably, the inner face of the back 19 is lined with suitable felt or other yieldable cushioning material 34 in a manner and for the purpose well known in the art.

To releasably secure the back in its operative position wherein it exerts the required pressure against the sensitized sheet 35 and the negative 36, suitably manually operable latching means is provided. Said means comprises the plate 37 suitably secured to the back as by means of the rivets 38 or the like and provided with openings as 39 for the reception of the domed projections 40 upstanding from the back 19 whereby said plate 37 may be accurately secured in its proper position.

The central portion 41 of the plate is elevated above the remaining portion thereof to provide the recess 42 thereunder for the slidable reception of the locking slide 43. Said slide is made of a single piece of sheet metal and is provided with a portion 44 reduced in width and designed to reciprocate longitudinally in the recess 42. The reduced portion terminates at its right end, as viewed in Fig. 2, in the shoulders 45 adapted to engage the right edge of the plate 37 and thereby to limit the movement of the slide in its locking direction toward the left. At its left end the reduced portion terminates in shoulders 46 designed to engage the left edge of the plate 37 to limit the movement of the slide in releasing direction toward the right.

An upwardly convex or cam portion 47 is provided at the left end of the slide, said portion terminating in the convex edge 48 designed to enter the slot 18 and to co-operate therewith not only to lock the back in place, but also to exert downward pressure on the back, the amount of such pressure depending upon how far the slide is moved outwardly through the slot, the convex portion 47 serving as a cam for that purpose. At its right end the slide terminates in an upstanding integral finger-piece 49 by means of which the slide may be readily manipulated.

Auxiliary manually operable means are also provided to hold the sheets 35 and 36 in place when the locking slide has been operated to release the back and when it is desired to inspect the progress of the printing operation. Said auxiliary means prevents relative displacement of the sheets 35 and 36 during such inspection, and maintains said sheets in the exact position required until manually released to free said sheets.

The sheet holding means comprises the Z-shaped holder 50 of a single piece of spring sheet metal. The upper or operating flange 51 of the holder, as viewed in Figs. 2 and 4, extends outwardly of the flange 14 while the lower or holding flange 52 extends inwardly of the frame 10 into position normally to contact with the glass plate 13 or with a sheet or sheets interposed between said flange 52 and the glass. The upright flange 53 connecting the flanges 51 and 52 is arranged adjacent the inner surface of the flange 10. A pair of slits or slots as 54 and 55 separates and frees the holding flange 52 from the respective side portions 56 and 57 of the operating flange 51, said slots extending inwardly toward each other from the outer edge of the holder along the bottom edge of the upright flange 53 where it joins the flange 52, then extending vertically through the flange 53 and then into the flange 51 to a point adjacent the finger grip portion 58 of the holder. There is thereby provided a central portion 59 on the flange 51 which is integral with the central portion of the flange 53 and also integral with the entire holding flange 52, whereby when said central portion 59 is rocked, the portion 53 and the flange 52 are rocked therewith as a unit independently of the fixation or movement of the side portions 56, 57 and the side portions of the connecting flange.

A pair of suitable fastening elements such as screws or rivets 60 and 61 secure the outer side portions of the flange 53 to the frame flange 14. One or more outstanding ribs as 62 may extend through the central or relatively movable portions of the flanges 51 and 53 to maintain said flanges in their proper relative positions against distortion.

Underneath the operating flange 51, as viewed in Figs. 2 and 4, is arranged the stop element 63 in the form of a bracket having a flange 64 thereof suitably secured to the frame flange 14 and having the outstanding flange 65 thereof arranged normally in spaced vertical relation to the flange 51.

When the back 19 is in its locked position, the holding flange 52 is received in a suitable recess 66 of slightly greater area than said holding flange and formed by pressing the material surrounding the recess upwardly to form a pocket. Consequently, the back exerts its pressure when in its locked position upon that portion of the negative and sensitized sheets underneath the holding flange 52 through its pressure upon said flange.

It will be seen that when the finger portion 58 is depressed against its stop 63, the entire free central part of the holder is rotated in a clockwise direction as viewed in Fig. 4. Such rotation or rocking of the free central part of the holder raises the holding flange 52 and releases the sheet or sheets held thereby for removal. Owing to the securing or fixation in place of the side portions of the flange 53 beyond the slots 54 and 55, depression of the operating flange of the holder distorts said side portions which tend to assume their normal positions when the operating flange is released, thereby rocking the entire central portion of the holder as a unit in the reverse direction and into the normal gripping positions thereof.

It will be seen that I have provided a primary and an auxiliary holding means of simple construction and easy to manipulate and well adapted for the purposes herein explained; that I have also provided a simple and comparatively inexpensive but efficient printing frame adapted for quantity production.

While I have shown and described certain specific embodiments of my invention, I do not wish to be understood as limiting myself thereto, but intend to claim the invention as broadly as may be permitted by the scope of the appended claims.

I claim:

1. In a photographic printing frame, a flanged frame member, and a negative holder on the frame member, said holder comprising a pair of substantially parallel flanges joined by a connecting flange, one of said parallel flanges being arranged inside of the frame member and the other outstanding beyond the frame member, the outer side parts of the connecting flange being separated from said one of the parallel flanges and from the central part of the connecting flange by a pair of spaced slots, said outer side parts of the connecting flange being secured to a flange of the frame member.

2. In a photographic printing frame, a flanged frame member, a negative holder on the frame member, said holder comprising a pair of substantially parallel flanges joined by a connecting flange, one of said parallel flanges being arranged inside of the frame member and the other outstanding beyond the frame member, the outer side parts of the connecting flange being separated from said one of the parallel flanges and from the central part of the connecting flange by a pair of spaced slots, said outer side parts of the connecting flange being secured to a flange of the frame member, and a stop member adjacent the outstanding flange of the holder and limiting the amount of movement thereof.

3. In a photographic printing frame, a frame member having a flange, and a releasable negative holder of Z-shaped form having a holding flange within the frame member, an operating flange extending beyond the frame member, and a connecting flange joining parts of the holding and operating flanges, the holding flange being sparated from part of the connecting flange by slots, said slots also separating the central part of the operating flange from the side parts thereof, said part of the connecting flange being secured to the flange of the frame member.

4. In a photographic printing frame, a frame member, and auxiliary means for holding a negative to the frame member and comprising a one-piece spring member having a holding flange and a slotted operating flange having part thereof continuous with the holding flange and swingable as a unit therewith, the remaining parts of the operating flange being fixed to the frame member.

5. In a photographic printing frame, a frame member, and a one-piece holder having a holding flange and a slotted operating flange, the operating flange having a part thereof fixed to the frame member and having another part free of the fixed part and movable relatively thereto with the holding flange to engage and release a negative in the frame member on the distortion of the fixed part.

6. In a photographic printing frame, a one-piece sheet metal frame member provided with flanges on all of its edges, a pair of similar projections struck from and extending inwardly from corresponding ends of an opposed pair of said flanges, a sheet metal member provided with perforated side flanges receiving said projections and being thereby pivoted to the frame member, said back having a recess therein, a Z-shaped negative holder of a single piece of sheet metal provided with slots and with a holding flange freed by said slots from the adjacent parts of the holder, means for securing said adjacent parts to a flange of the frame member, said holding flange being received in the recess of the back, and means for releasably securing the back to the frame member whereby said back in its secured position exerts pressure upon said holding flange.

7. In a photographic printing frame, a one-piece sheet metal frame member having a transparent panel and provided with flanges, one of said flanges having a slot therein, a one-piece sheet metal back pivoted to the frame member, said back having a recess therein, a one-piece slide carried by the back and having a shouldered reduced portion intermediate its ends and having a finger piece at its inner end and a convex cam portion at its outer end adapted to enter the slot to lock the back in place, a one-piece slotted Z-shaped holder having a free part including a holding flange normally engaging said panel and fitted into the recess of the back and having a depressable operating flange outstanding from the frame member, and a stop on the frame member limiting the movement of said operating flange.

8. In a photographic printing frame, a slotted frame member, a back pivoted to the member, a one-piece sheet metal slide having a flat portion intermediate its ends resting with its wide face on the back, part of said intermediate portion having edge cut-outs therein terminating in spaced shoulders, stop means on the back for slidably supporting the slide and engaging the shoulders thereof on the movement of the slide to a predetermined extent in either direction, said means comprising a sheet metal member having spaced parallel flanges passing through the cutouts and secured to the back, said member having a flat part joining the parallel flanges and parallel to and outside of the flat portion of the slide, a convex portion at one end of the slide adapted to enter and leave the slot of the frame member, and an outstanding finger portion at the other end of the slide.

9. In a photographic printing frame, a one-piece sheet metal slotted frame member, a one-piece sheet metal back having a recess therein, a flat sheet metal shouldered slide carried by the back and having a convex end portion adapted to enter the slot of the frame member to press the back against the frame member, a sheet metal cover and stop for the slide secured to the back and providing a recess for the reception of the slide between the cover and the back, and a one-piece sheet metal negative holder secured to the frame member and having a holding portion thereof freed from the secured portion thereof by slots in said holder, said holding portion entering the recess of the back and being pressed thereby when the slide enters the slot of the frame member.

10. In a photographic printing frame, a frame member, primary negative holding means within the frame member comprising a back and means for releasably locking the back to and pressing the back against the frame member, and auxiliary negative holding means comprising a slotted one-piece sheet metal member having a holding flange within the frame member and having another operating flange in part fixed to the frame member and in part free of the frame member and movable relatively thereto.

HERMAN NEUWIRTH.